United States Patent
Szapiel

(10) Patent No.: US 9,411,148 B2
(45) Date of Patent: Aug. 9, 2016

(54) IMAGE DEFLECTOR FOR GUN SIGHTS

(71) Applicant: RAYTHEON CANADA LIMITED, Ottawa (CA)

(72) Inventor: Stanislaw Szapiel, Port Mcnicoll (CA)

(73) Assignee: RAYTHEON CANADA LIMITED, Ottawa (CA)

( * ) Notice: Subject to any disclaimer, the term of this patent is extended or adjusted under 35 U.S.C. 154(b) by 117 days.

(21) Appl. No.: 14/036,325

(22) Filed: Sep. 25, 2013

(65) Prior Publication Data

US 2015/0082680 A1    Mar. 26, 2015

(51) Int. Cl.
G02B 23/00 (2006.01)
G02B 23/10 (2006.01)
F41G 1/38 (2006.01)
F41G 1/30 (2006.01)

(52) U.S. Cl.
CPC *G02B 23/10* (2013.01); *F41G 1/30* (2013.01); *F41G 1/38* (2013.01)

(58) Field of Classification Search
CPC ................................. G02B 23/00; G02B 23/08
USPC .................................................. 359/399–432
See application file for complete search history.

(56) References Cited

U.S. PATENT DOCUMENTS

| 5,166,820 A * | 11/1992 | Fujita ................... G01B 11/00 235/462.35 |
| 5,349,469 A * | 9/1994 | Francis ......................... 359/420 |
| 6,487,809 B1 | 12/2002 | Gaber |
| 2011/0041377 A1 | 2/2011 | Thomas et al. |
| 2011/0128620 A1* | 6/2011 | Denis ..................... G02B 23/04 359/420 |
| 2012/0106170 A1* | 5/2012 | Matthews ................ F41G 1/30 362/311.06 |

* cited by examiner

*Primary Examiner* — Stephone B Allen
*Assistant Examiner* — Rahman Abdur
(74) *Attorney, Agent, or Firm* — Lando & Anastasi, LLP

(57) ABSTRACT

Optical apparatus in which a beam deflector is used to reposition the sight beam from a reflex sight. In one example, an optical apparatus includes a reflex sight configured to produce a collimated reflex sight beam directed along an optical axis, and a beam deflector coupled to an output of the reflex sight and configured to deflect the reflex sight beam by a selected angle of deflection relative to the optical axis to reposition an eyebox of the reflex sight off-axis with respect to the optical axis and remote from the reflex sight. In certain examples, the optical apparatus also includes a telescopic sight, and the beam deflector is configured to deflect the collimated reflex sight beam to overlap the reflex sight beam with the exit pupil of the telescopic sight.

17 Claims, 5 Drawing Sheets

IMAGE DEFLECTOR FOR GUN SIGHTS

BACKGROUND

There are applications in which it is desirable to include and use both a telescopic sight and a reflex ("red dot") sight with a weapon, such as a rifle. However, the problem of installing and efficiently using both a telescopic sight and a reflex sight on the same rifle (or other weapon) has not been entirely solved. Referring to FIG. 1, in a typical configuration, the reflex sight 110 is fixed on the top of the telescopic sight 120. Thus, the eyebox 115 for the reflex sight 110 is located above the eyebox 125 for the telescopic sight 120, as shown in FIG. 1. The eyebox 125 for the telescopic sight 120 is the volume confined by two conuses centered on the optical axis 130 and having a circular exit pupil 140 as a common base. Such a configuration forces an operator to move his/her head up to use the red dot sight and then down to the use magnified telescopic sight again. As a result, the cheek-weld position may not be preserved, and the operator's response may be relatively slow if the combination of sights must be used. Furthermore, raising the head even an inch or so higher to see through the reflex sight can make the operator more vulnerable to actions of an enemy combatant.

Conventional attempts to address these problems have been focused on superimposing imagery from both sights on a common optical axis (typically, the optical axis 130 of the telescopic sight 120). Some examples of such superposition approaches are disclosed in U.S. Pat. No. 6,487,809 and U.S. Pre-Grant Publication No. 2011/0041377. Both of these publications describe complicated optical layouts with additional folding or switchable mirrors or splitters that need to be added to the telescopic sight. There are several disadvantages associated with such layouts. In particular, the fold optics inserted between the eyepiece of the telescopic sight and the operator's eye significantly reduces eye relief. Although it is possible to design a telescopic sight with greater than initially required eye relief, in that case, the field of view in target space will be reduced unless magnification of the telescopic sight is reduced as well. Furthermore, for longer eye reliefs the lens count in the eyepiece is typically higher since correcting for aberrations is more difficult and a field lens must generally be included. U.S. Pre-Grant Publication No. 2011/0041377 discloses an eyepiece having an upright fold, which shortens the length of the sight, but disadvantageously raises the operator's head position above the rifle for both modes of operation (reflex sight mode and telescopic sight mode).

Additionally, in these examples, it is impossible to simultaneously view both the reflex sight channel and the telescopic sight channel, and a switching mechanism is required to toggle between the two modes of operation. Such conventional solutions require many additional optical and mechanical elements, which substantially increases the mass and cost of the system. Furthermore, these solutions are based on very specific design layouts, which cannot be efficiently implemented in combinations of existing off-the-shelf sighting devices.

SUMMARY OF INVENTION

Aspects and embodiments are directed to systems and methods for delivering the eyebox generated by a device to the operator's eye, rather than requiring the operator's head to be "delivered" to the eyebox. In particular, aspects and embodiments are directed to solving the problem of installing and efficiently using of both a telescopic sight and a reflex ("red-dot") sight on the same rifle (or other weapon). As discussed in more detail below, certain embodiments incorporate a beam deflector which redirects the collimated output beam from a reflex sight to the exit pupil of the telescopic sight, thereby at least partially overlapping the eyeboxes associated with each sight. Using examples of the systems discussed herein may allow shooting from protected, secure positions (for example, from behind a corner), as also discussed further below.

According to one embodiment, an optical sighting apparatus comprises a telescopic sight configured to produce an exit pupil, a reflex sight configured to produce a collimated reflex sight beam, and a beam deflector coupled to an output of the reflex sight and configured to deflect the collimated reflex sight beam to produce a deviated reflex sight beam and to overlap the deviated reflex sight beam with the exit pupil of the telescopic sight.

In one example the reflex sight is mounted to the telescopic sight. The beam deflector may comprise a pair of prisms rotatable about an optical axis coincident with the collimated reflex sight beam. In one example, each prism of the pair of prisms includes first and second prism elements cemented together. In one example, the first prism element is made of OHARA S-TIM2, and the second prism element is made of OHARA S-LAH65. The beam deflector may be configured to deviate the collimated reflex sight beam by a selected angle of deflection relative to the optical axis, the angle of deflection being selected based on a degree of rotation of the pair of prisms about the optical axis. In another example the reflex sight is further configured to produce a reflex sight image, the reflex sight image including a reticule.

According to another embodiment, an apparatus comprises a reflex sight configured to produce a collimated reflex sight beam directed along an optical axis, and a beam deflector coupled to an output of the reflex sight and configured to deflect the reflex sight beam by a selected angle of deflection relative to the optical axis to reposition an eyebox of the reflex sight off-axis with respect to the optical axis and remote from the reflex sight.

In one example the apparatus further comprises a firearm, the reflex sight being mounted to the firearm, and the reflex sight beam includes a reticule representative of an aiming point of the firearm. In another example the apparatus further comprises a telescopic sight configured to produce an exit pupil, and the beam deflector is configured to reposition the eyebox of the reflex sight such that the eyebox overlaps the exit pupil of the telescopic sight. In one example the beam deflector comprises a pair of prisms rotatable about the optical axis. Each prism of the pair of prisms may include first and second prism elements cemented together. The materials of the first and second prism elements may be selected such that each prism is achromatic. In one example the angle of deflection is controlled based on a degree of rotation of the pair of prisms about the optical axis.

According to another embodiment, a method of viewing a remote scene comprises acts of producing a collimated reflex sight beam with a reflex sight, the collimated reflex sight beam including a reticule, directing the collimated reflex sight beam along an optical axis of the reflex sight, and deflecting the collimated reflex sight beam by a selected angle of deflection relative to the optical axis to reposition an eyebox of the reflex sight off-axis with respect to the optical axis and remote from the reflex sight.

In one example of the method in which the collimated reflex sight beam represents a first image of the remote scene, the method further comprises producing a second image of the remote scene with a telescopic sight, and deflecting the collimated reflex sight beam includes repositioning the eyebox of the reflex sight overlapping an exit pupil of the telescopic sight to simultaneously present the first and second images at the exit pupil. In another example the method further comprises selecting the angle of deflection by rotating a pair of prisms about the optical axis, and deflecting the collimated reflex sight beam includes passing the collimated reflex sight beam through the pair of prisms.

Still other aspects, embodiments, and advantages of these exemplary aspects and embodiments are discussed in detail below. Embodiments disclosed herein may be combined with other embodiments in any manner consistent with at least one of the principles disclosed herein, and references to "an embodiment," "some embodiments," "an alternate embodiment," "various embodiments," "one embodiment" or the like are not necessarily mutually exclusive and are intended to indicate that a particular feature, structure, or characteristic described may be included in at least one embodiment. The appearances of such terms herein are not necessarily all referring to the same embodiment.

BRIEF DESCRIPTION OF THE DRAWINGS

Various aspects of at least one embodiment are discussed below with reference to the accompanying figures, which are not intended to be drawn to scale. The figures are included to provide illustration and a further understanding of the various aspects and embodiments, and are incorporated in and constitute a part of this specification, but are not intended as a definition of the limits of the invention. In the figures, each identical or nearly identical component that is illustrated in various figures is represented by a like numeral. For purposes of clarity, not every component may be labeled in every figure. In the figures.

DETAILED DESCRIPTION

Aspects and embodiments are directed to the combination of a reflex sight with an adjustable beam deflector that redirects the eyebox or sight beam of the reflex sight to a desired location. This configuration may allow an operator using the reflex sight to aim and fire the associated weapon from a concealed location, as discussed in more detail below. Certain aspects and embodiments are directed to the combination of a telescopic sight, a reflex sight, and a beam deflector that angularly deviates the reflex sight beam from its original output position towards the eyebox of the telescopic sight. Unlike conventional dual-mode sighting devices, embodiments of the present invention do not require that two collimated beams be superimposed on the optical axis of the telescopic sight. As used herein, the term "telescopic sight" is intended to refer to an optical sighting device that includes optics configured to receive and collimate electromagnetic radiation from a viewed scene, and an eyepiece that produces a remotely located real exit pupil. The telescopic sight may or may not be magnified, and may optionally include a variable zoom (magnification) component. As used herein, the term "reflex sight" is intended to refer to a non-magnifying optical device that allows an operator to look through a partially reflecting glass element and see an illuminated projection of an aiming point (or some other image) superimposed on the field of view.

It is to be appreciated that embodiments of the methods and apparatuses discussed herein are not limited in application to the details of construction and the arrangement of components set forth in the following description or illustrated in the accompanying drawings. The methods and apparatuses are capable of implementation in other embodiments and of being practiced or of being carried out in various ways. Examples of specific implementations are provided herein for illustrative purposes only and are not intended to be limiting. Also, the phraseology and terminology used herein is for the purpose of description and should not be regarded as limiting. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms. Any references to front and back, left and right, top and bottom, upper and lower, and vertical and horizontal are intended for convenience of description, not to limit the present systems and methods or their components to any one positional or spatial orientation.

Figure 1:
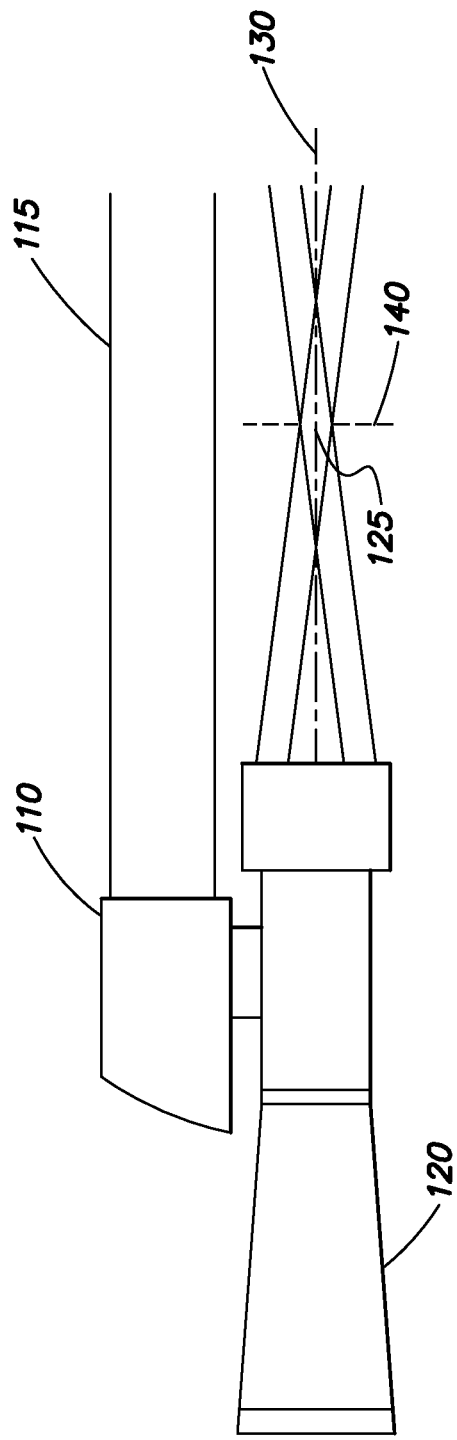
FIG. 1 is a schematic diagram of an example of a conventional dual-mode sighting apparatus.
Figure 2:
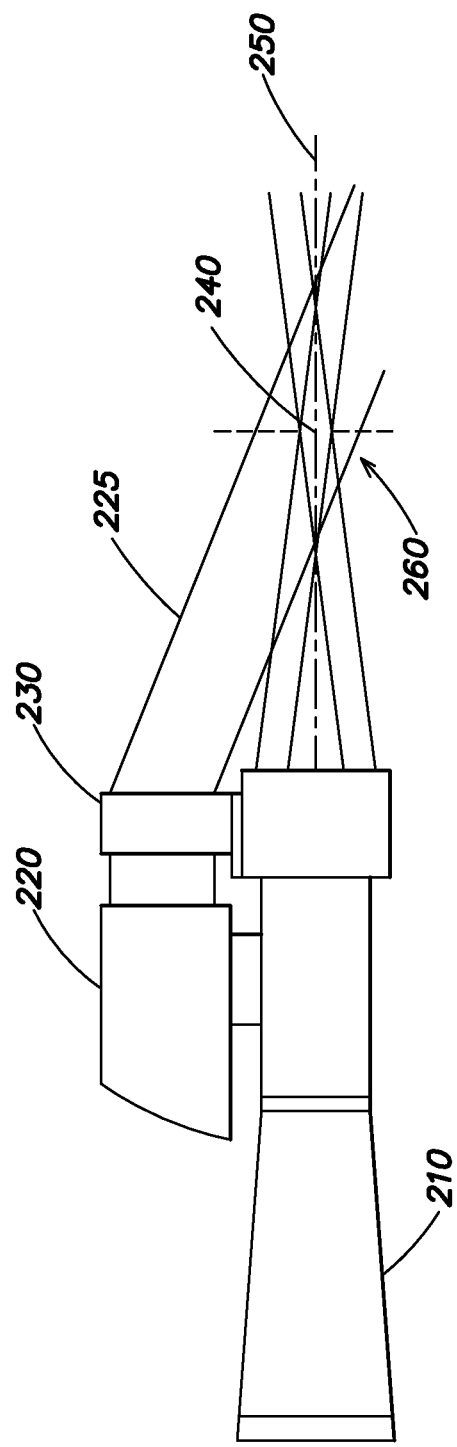
FIG. 2 is a schematic diagram of one example of a combination telescopic and reflex sighting apparatus including a beam deflector according to aspects of the invention.

Referring to FIG. 2, there is illustrated a schematic diagram of one example a sighting apparatus according to one embodiment. The apparatus 200 includes a telescopic sight 210, which may be a magnified telescopic sight, and a reflex sight 220. In one example, the reflex sight 220 is configured to produce a "red dot" reticule. Instead of configuring the apparatus 200 as a dedicated dual-mode device, as is done in conventional approaches, according to one embodiment, a functional element, namely a beam deflector 230 is introduced. The beam deflector 230 receives the collimated output beam 225 from the reflex sight 220 and directs the beam towards the exit pupil 240 of the telescopic sight 210. In the illustrated example, the exit pupil 240 of the telescopic sight 210 is positioned on the optical axis 250 of the telescopic sight and is substantially circular. The deviated beam 225 from the reflex sight 220 overlaps with the eyebox space 260 of the telescopic sight 210. As a result, if an operator's eye is located within the eyebox space 260, the operator will see both the entire image delivered by the telescopic sight 210 and the entire image from the reflex sight 220, including the red dot reticule.

Figure 3:
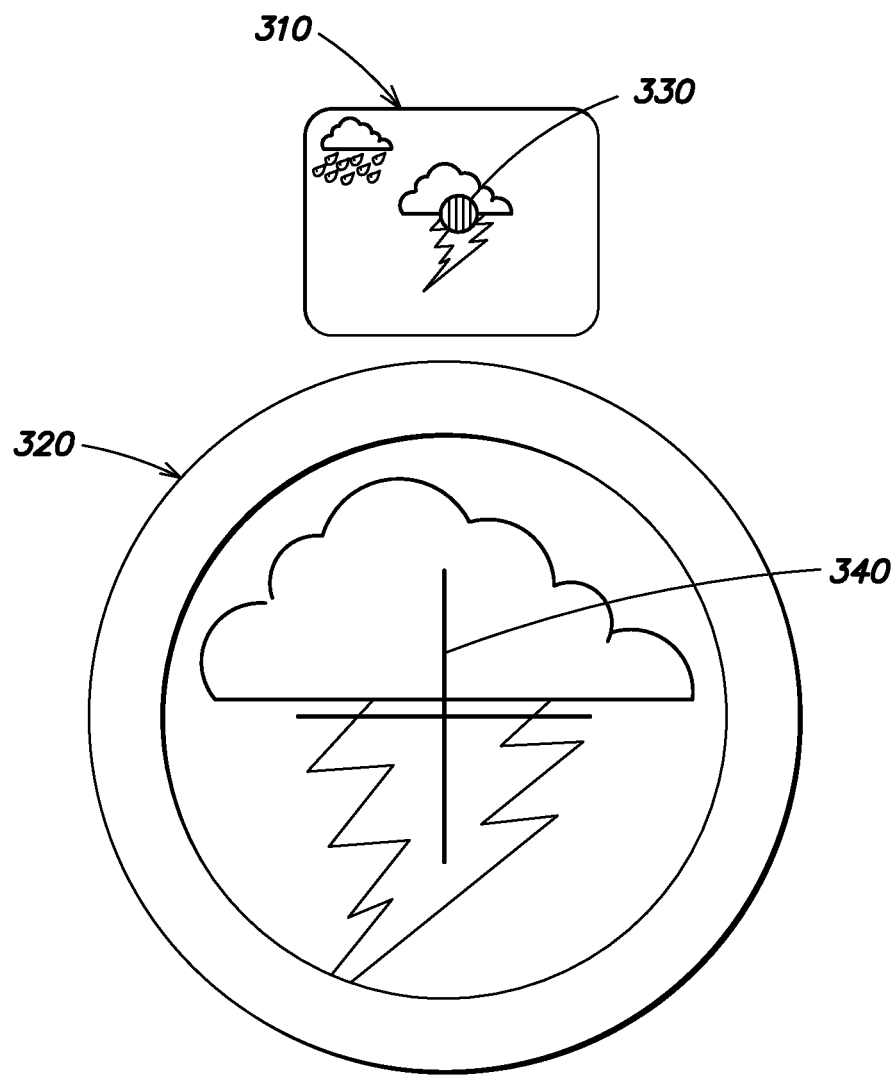
FIG. 3 is a schematic diagram of one example of an operator's perception of a viewed scene using the apparatus of FIG. 2, according to aspects of the invention.

Thus, referring to FIG. 3, images from both sights may be viewed simultaneously. In one example, as shown in FIG. 3, the image 310 from the reflex sight 220 may be observed above of the image 320 from the telescopic sight 210. However, in other embodiments, the image 310 may be positioned to the side of or below the image 320. As the reflex sight 220 is typically a non-magnified sight, the image 310 may represent a wide field of view. The image 310 also includes the red dot reticule 330 from the reflect sight 220. The telescopic sight 210 may be magnified, and may have a narrow field of view compared to that of the reflex sight 220. Thus, the image 320 from the telescopic sight may represent a magnified portion of the wider field of view presented in the image 310 from the reflex sight 220. In some examples, the image 320 may also include a cross reticule 340. Allowing the operator to simultaneously view both a relatively wide field of view and a relatively narrow field of view may allow for more accurate aiming and/or target recognition, while maintaining the situational awareness provided by the wide field of view. Additionally, since both images may be viewed simultaneously, the operator will be not forced to change his/her cheek-weld position. No action to move up the head or to engage a lever to toggle between the image form one sight and the image from the other sight is required.

According to one embodiment, beam deflector 230 is configured to permanently deviate the beam 225 from the reflex sight 220 by a fixed amount to overlap the beam with eyebox space 260 of the telescopic sight 210, as discussed above. According to another embodiment, the beam deflector 230 may be configured to be switchable between an "ON" position in which the beam 225 from the reflex sight 220 is deviated, and an "OFF" position in which the reflex sight beam is non-deviated. Being able to turn the beam deflector 230 on and off provides the operator more control over the viewed imagery, which may be desirable in some applications or circumstances. Additionally, it may be preferable to turn the beam deflector 230 off if only one sight is engaged for an extended period of time. For example, if the operator is using only the reflex sight for an extended period, it may be preferable to turn off the beam deflector 230 and have the operator view through the reflex sight alone, rather than viewing the reflex sight image 310 through the telescopic sight eyebox 260. In another example, circumstances, such as damage to the telescopic sight 210 or the reflex sight 220, for example, may make it preferable to be able to select to view the imagery from only one sight. According to another embodiment, the beam deflector may be configured to allow the operator to deviate the beam 225 from the reflex sight 220 to any of a range of different positions. This configuration may be particularly useful for allowing the operator to view a scene from a hidden location, as discussed further below.

Figure 4A:
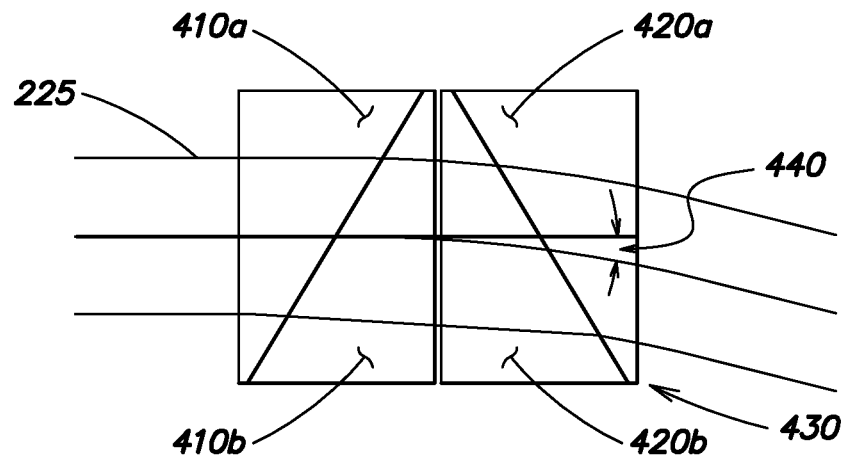
FIG. 4A is a schematic diagram of one example of a beam deflector including a set of prisms, the beam deflector shown in an "ON" position, according to aspect of the invention.
Figure 4B:
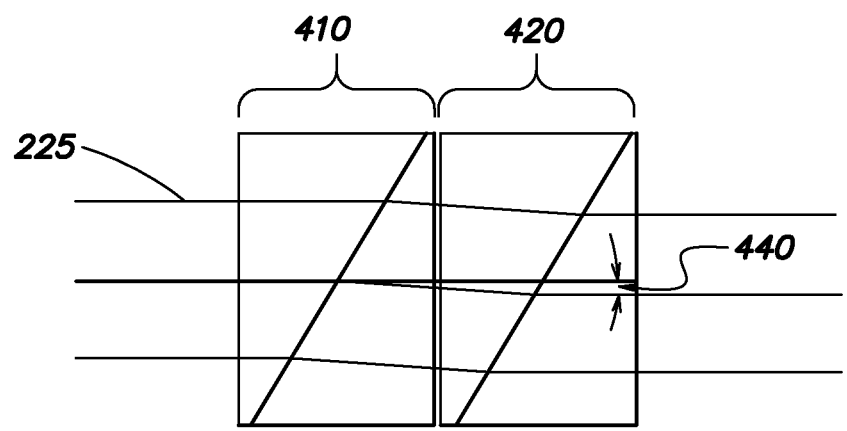
FIG. 4B is a schematic diagram illustrating the example beam deflector of FIG. 4A in an "OFF" position, according to aspects of the invention.

The beam deflector 230 may be implemented in numerous ways, using any of a variety of optical components, including, for example, mirrors (optionally tiltable or movable mirrors for the examples in which the beam deflector may be turned on and off, and/or the angle of deflection may be varied) or prisms, such as Risley prisms. FIGS. 4A and 4B illustrate one example of a beam deflector 230 implemented using a set of prisms. In the illustrated example, the beam deflector 230 includes two prisms 410, 420, each prism including a pair of cemented prism elements having identical geometry (the same linear dimensions and wedge angles) but made of optical materials having different indices of refraction and different Abbe numbers. In the example illustrated in FIGS. 4A and 4B, the wedge angle 430 is approximately 31 degrees; however, in other implementations, other wedge angles may be selected. Each cemented prism pair 410, 420 includes two prism elements 410a, 410b, and 420a, 420b, respectively, that are cemented together such that the cemented prism "appears" as a plane window (has an overall rectangular shape, as shown in FIGS. 4A and 4B), rather than a prism, which facilitates ease of mounting.

According to one embodiment, the materials used for the prism elements 410a, 410b, 420a, and 420b, and the geometry of the prism elements, may be selected such that the prisms 410, 420 are strictly achromatic. A pair of cemented prisms can be made achromatic by careful selection of the wedge angles of the individual prism elements matched to proper choice of optical materials. The two prism elements in the pair are made of different materials having, in general, different indices of refraction n1 and n2, and having different coefficients of optical dispersion (Abbe numbers), v1 and v2. In certain examples, the requirement that both prism elements have exactly the same wedge angle significantly restricts the solution space; however, certain practical combinations of glasses are still possible. In one example, when the wedge angle is approximately 31 degrees, the first prism elements 410a, 420a are made of optical flint glass OHARA S-TIM2 (n1=1.620 and v1=36.3), and the second prism elements 410b and 420b are made of optical glass S-LAH65 (n2=1.804 and v1=46.6). With this selection of materials and the configuration shown in FIGS. 4A and 4B, the lateral color may be less than approximately 45 arc-seconds, which is below the resolution of a human eye.

Large wedge angles also cause aberration of distortion, but with the choice of geometries and materials as given above, distortion in see-through mode may be less than about 4.6% over a field of view of less than 15 degrees.

FIG. 4A illustrates an example of the beam deflector 230 with the two cemented prisms 410, 420 oriented with respect to one another such that the beam 225 from the reflex sight 220 is deviated by a selected angular amount. In the illustrated example, with the specifications given above, the ray deviation 440 is approximately 13 degrees. However, as will be appreciated by those skilled in the art, given the benefit of this disclosure, the angle of the ray deviation is not limited to 13 degrees, and may be adjusted by rotating the two prisms 410, 420 about an optical axis of the incoming beam 225. In particular, synchronized rotation of the prisms 410 and 420 in opposite directions about the optical axis results in linear scan of the beam 225. The angle of ray deviation may be selected or adjusted based on, for example, the relative positioning of the reflex sight 220, the telescopic sight 210, and the exit pupil 240, or a desired relative location between the reflex sight and an operator. According to one embodiment, switching the beam deflector off may be achieved by rotating the second prism 420 180 degrees about an optical axis of the incoming beam 225 (or relative to the first prism 410), as shown in FIG. 4B. In the "OFF" configuration, the ray deviation 440 is approximately 0 degrees.

Figure 5:
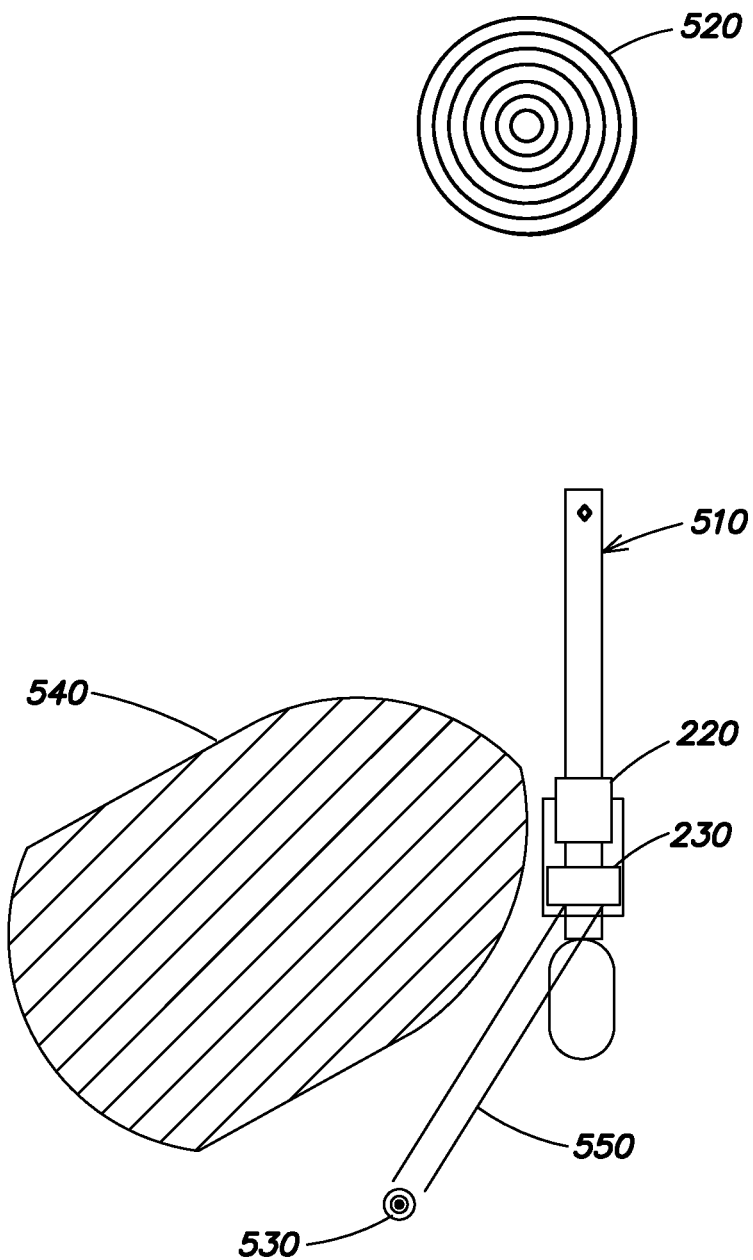
FIG. 5 is a schematic diagram illustrating (top view) one example of an application of a sighting apparatus according to aspects of the invention.

As discussed above, another application for the use of a beam deflector in combination with a reflex sight is to allow an operator the ability to view the image 310 from the reflex sight 220 without having his/her head in close proximity to the reflex sight, or along the line of sight (optical axis) of the undeviated beam 225. For example, referring to FIG. 5, an operator may wish to aim an optical device 510 (such as a weapon, for example a rifle or other firearm, or a spotting scope or other viewing apparatus) at a remote target 520 from a hidden location 530 (e.g., from behind an obstruction 540 that prevents the target from viewing the operator). The beam deflector 230 may be used to deviate the collimated output beam 225 from the reflex sight 220 to relocate the eyebox 550 of the reflex sight to the hidden location 530, thereby allowing the operator to view the target 520 (and red dot reticule) while remaining hidden. The angle of deviation of the beam 225 may be controlled by controlling the angle of rotation of the prisms 410 and 420 in the beam deflector 230, as discussed above. In one example, the beam deflector 230 may include an actuator that effects the rotational motion of the prisms 410, 420, and a controller that controls the actuator to select the degree of rotation. The operator may be able to remotely control the controller (e.g., using a wired or wireless remote control device, as well known in the art) to change the angle of deflection of the eyebox 550 such that the operator can view the image 310 from the reflex sight from a desired location. Although the example illustrated in FIG. 5 shows lateral deflection of the beam 225 and eyebox 550, those skilled in the art will appreciate, given the benefit of this disclosure, that the beam 225 and eyebox 550 may also or alternatively be deflected upwards or downwards, for example, to allow the operator to aim at and view the target with his/her head above or below the optical device 510. A combination of vertical and horizontal deviation can be further achieved and/or adjusted by rotating the two prisms 410, 420 together about an optical axis of the incoming beam 225.

Thus, aspects and embodiments provide a mechanism by which an operator may view imagery (including a red dot reticule) from a reflex sight without having to position his/her eye in line with the optical axis of the reflex sight. As discussed above, this may have numerous advantages and applications, including allowing the operator to use a reflex sight from a hidden location, and/or to simultaneously view imagery from both the reflex sight and a telescopic sight without requiring complex image processing or optical arrangements. In embodiments in which the beam deflector is used to relocate the eyebox of the reflex sight, for example, to a hidden location as discussed above with respect to FIG. 5, the reflex sight may be used on a weapon or other device with or without a telescopic sight. The beam deflector provides a simple, compact solution to the problem of efficiently installing and using both a telescopic sight and reflex sight together on the same optical device (e.g., same weapon or viewing device) without requiring the operator to move his/her head from one sight to the other. Using the beam deflector, the eyeboxes of the reflex sight and telescopic sight may be overlapped, without requiring that two collimated beams (from the reflex sight and telescopic sight) be superimposed on the optical axis of the telescopic sight. This greatly simplifies the optical design, while providing the desired functionality of simultaneously viewing of the imagery from both sights.

Having described above several aspects of at least one embodiment, it is to be appreciated various alterations, modifications, and improvements will readily occur to those skilled in the art. Such alterations, modifications, and improvements are intended to be part of this disclosure and are intended to be within the scope of the invention. Accordingly, the foregoing description and drawings are by way of example only, and the scope of the invention should be determined from proper construction of the appended claims, and their equivalents.

What is claimed is:

1. An optical sighting apparatus comprising:
a telescopic sight configured to produce an exit pupil;
a reflex sight configured to produce a collimated reflex sight beam; and
a beam deflector coupled to an output of the reflex sight, the beam deflector being switchable between an ON position and an OFF position, and including a pair of prisms, each prism of the lair of prisms including a first prism element and a second prism element, in the ON position, the beam deflector being configured to deflect the collimated reflex sight beam to produce a deviated reflex sight beam and to overlap the deviated reflex sight beam with the exit pupil of the telescopic sight, and wherein when the beam deflector is in the OFF position, the collimated reflex sight beam is non-deviated.

2. The optical sighting apparatus of claim 1, wherein the reflex sight is mounted to the telescopic sight.

3. The optical sighting apparatus of claim 1, wherein each prism of the pair of prisms is rotatable about an optical axis coincident with the collimated reflex sight beam.

4. The optical sighting apparatus of claim 3, wherein the first and second prism elements of each prism of the pair of prisms are cemented together.

5. The optical sighting apparatus of claim 3, wherein the beam deflector is configured to deviate the collimated reflex sight beam by a selected angle of deflection relative to the optical axis, the angle of deflection being selected based on a degree of rotation of the pair of prisms about the optical axis.

6. The optical sighting apparatus of claim 1, wherein the reflex sight is further configured to produce a reflex sight image, the reflex sight image including a reticule.

7. An apparatus comprising:
a reflex sight configured to produce a collimated reflex sight beam directed along an optical axis;
a telescopic sight configured to produce an exit pupil; and
a beam deflector coupled to an output of the reflex sight, the beam deflector being switchable between an ON position and an OFF position, and including a pair of prisms, each prism of the lair of prisms including a first prism element and a second prism element, in the ON position, the beam deflector being configured to deflect the reflex sight beam by a selected angle of deflection relative to the optical axis to reposition an eyebox of the reflex sight off-axis with respect to the optical axis and remote from the reflex sight, wherein the beam deflector is configured to reposition the eyebox of the reflex sight such that the eyebox overlaps the exit pupil of the telescopic sight, and wherein when the beam deflector is in the OFF position, the collimated reflex sight beam is non-deviated.

8. The apparatus of claim 7, further comprising a firearm, the reflex sight being mounted to the firearm, and wherein the reflex sight beam includes a reticule representative of an aiming point of the firearm.

9. The apparatus of claim 7, wherein each prism of the pair of prisms is rotatable about the optical axis.

10. The apparatus of claim 9, wherein the first and second prism elements of each prism of the pair of prisms are cemented together.

11. The apparatus of claim 10, wherein materials of the first and second prism elements are selected such that each prism of the pair of prisms is achromatic.

12. The apparatus of claim 9, wherein the angle of deflection is controlled based on a degree of rotation of the pair of prisms about the optical axis.

13. A method of viewing a remote scene comprising:
producing a collimated reflex sight beam with a reflex sight, the collimated reflex sight beam including a reticule, wherein the collimated reflex sight beam represents a first image of the remote scene;
directing the collimated reflex sight beam along an optical axis of the reflex sight;
producing a second image of the remote scene with a telescopic sight;
receiving selection of an ON position of a beam deflector, the beam deflector including a pair of prisms, each prism of the pair of prisms including a first prism element and a second prism element; and
deflecting the collimated reflex sight beam by a selected angle of deflection relative to the optical axis to reposition an eyebox of the reflex sight off-axis with respect to the optical axis and remote from the reflex sight with the beam deflector, wherein deflecting the collimated reflex sight beam includes repositioning the eyebox of the reflex sight overlapping an exit pupil of the telescopic sight to simultaneously present the first and second images at the exit pupil.

14. The method of claim 13, further comprising selecting the angle of deflection by rotating the pair of prisms about the optical axis; and wherein deflecting the collimated reflex sight beam includes passing the collimated reflex sight beam through the pair of prisms.

15. The optical sighting apparatus of claim 1, wherein the reflex sight is configured to deliver a first image of a remote scene to the exit pupil and the telescopic sight is configured to deliver a second image of the remote scene to the exit pupil, the first and second images being viewable from a single eye position simultaneously at the exit pupil.

16. The optical sighting apparatus of claim 1, wherein each of the first prism element and the second prism element of each prism of the pair of prisms has an identical geometry.

17. The optical sighting apparatus of claim 16, wherein the first prism element is made of a first material, and the second prism element is made of a second material, the second material having a different index of refraction from an index of refraction of the first material.

\* \* \* \* \*